(12) United States Patent
Akiyama

(10) Patent No.: US 11,784,510 B2
(45) Date of Patent: Oct. 10, 2023

(54) NON-CONTACT POWER TRANSMISSION DEVICE

(71) Applicant: OMRON Corporation, Kyoto (JP)

(72) Inventor: Shingo Akiyama, Ichinomiya-shi (JP)

(73) Assignee: OMRON Corporation, Kyoto (JP)

( * ) Notice: Subject to any disclaimer, the term of this patent is extended or adjusted under 35 U.S.C. 154(b) by 458 days.

(21) Appl. No.: 17/172,119

(22) Filed: Feb. 10, 2021

(65) Prior Publication Data

US 2021/0288522 A1 Sep. 16, 2021

(30) Foreign Application Priority Data

Mar. 10, 2020 (JP) .................................. 2020-041072

(51) Int. Cl.
*H02J 50/00* (2016.01)
*H01F 38/14* (2006.01)
*H02J 50/40* (2016.01)
*H02J 50/10* (2016.01)

(52) U.S. Cl.
CPC ............ *H02J 50/005* (2020.01); *H01F 38/14* (2013.01); *H02J 50/10* (2016.02); *H02J 50/40* (2016.02)

(58) Field of Classification Search
CPC .......... H02J 50/005; H02J 50/10; H02J 50/40; H01F 38/14

USPC ......................................................... 307/104
See application file for complete search history.

(56) References Cited

U.S. PATENT DOCUMENTS

| 2013/0005418 | A1* | 1/2013 | Ishida | ....................... B60L 3/04 463/6 |
| 2013/0286447 | A1* | 10/2013 | Shintani | ............. H04N 1/40056 358/475 |
| 2015/0001953 | A1* | 1/2015 | Fukuzawa | ............. H01F 27/363 307/104 |
| 2019/0109620 | A1* | 4/2019 | Shoji | .................... H04B 7/0682 |

FOREIGN PATENT DOCUMENTS

JP 6347983 B2 6/2018

* cited by examiner

*Primary Examiner* — Alfonso Perez Borroto
(74) *Attorney, Agent, or Firm* — METROLEX IP LAW GROUP, PLLC

(57) ABSTRACT

A non-contact power transmission device according to one or more embodiments is disclosed, which may include a fixed portion, a rotating portion that rotates about an axis, and a base cover including these. The fixed portion includes a first coil, a first substrate, and a light emitting element. The rotating portion includes a second coil, a second substrate, a light receiving element, and a case cover. The case cover is formed with a heat dissipation opening having an inclined surface, and generates airflow in which air is sucked into the inside of the case cover and is discharged to the outside of the case cover, as the rotating portion rotates.

12 Claims, 6 Drawing Sheets

NON-CONTACT POWER TRANSMISSION DEVICE

CROSS-REFERENCE TO RELATED APPLICATION

This application claims priority to Japanese Patent Application No. 2020-041072 filed with the Japan Patent Office on Mar. 10, 2020, the entire contents of which are incorporated herein by reference.

FIELD

The disclosure relates to a non-contact power transmission device that transmits power by utilizing magnetic coupling between coils.

BACKGROUND

As a device for transmitting power between two members, there is a non-contact power transmission device that transmits power by utilizing magnetic coupling between coils. For example, Japanese Patent No. 6347983 describes a configuration having a first coil held in a first holder and a second coil held in a second holder as such a non-contact power transmission device.

However, the non-contact power transmission device described in Japanese Patent No. 6347983 does not have a configuration for suppressing a rise in temperature inside the device. Therefore, in a case where the temperature inside the device rises in response to the first coil and the second coil generating heat due to the power transmission, it may be necessary to regulate continuous energization time and a current value. In the above described case, it is necessary to suppress continuous production time to a short time and secure an interval for cooling.

SUMMARY

A non-contact power transmission device according to one or more embodiments is provided, in which temperature inside the device does not easily rise even if a coil generates heat in power transmission.

A non-contact power transmission device according to one or more embodiments may include: a fixed portion having a first coil; a rotating portion having a second coil positioned to face the first coil and a cover member configured to cover a side of the second coil opposite to the first coil side, the rotating portion being configured to rotate about a rotation axis with respect to the fixed portion; and a rotation holding portion configured to rotatably hold the fixed portion and the rotating portion, in which the cover member has a fan configured to generate airflow in which air is sucked into inside of the cover member and the sucked air is discharged to outside of the cover member, as the rotating portion rotates.

According to the above configuration, the cover member has the fan generating airflow in which air is sucked into the inside of the cover member and the sucked air is discharged to the outside of the cover member, as the rotating portion rotates. Therefore, even if the first coil and the second coil generate heat in power transmission, force of air passing through the inside of the non-contact power transmission device may forcibly dissipate the heat and suppress a temperature rise inside the device.

As a result, it may not necessary to shorten continuous production time or secure an interval for cooling. In addition, it may be possible to prevent a decrease in power transmission efficiency and a decrease in a life of a mounted electronic component.

Further, in the non-contact power transmission device according to one or more embodiments, one or more heat dissipation openings having a longitudinal direction orthogonal to the rotation axis may be positioned on a surface of the cover member configured to cover a side opposite to the fixed portion side, and an opening end surface in the longitudinal direction of the heat dissipation opening has an inclined surface inclined so as to spread from outside of the opening toward inside of the opening. According to the above configuration, the cover member having the fan may be easily configured.

Further, in the non-contact power transmission device according to one or more embodiments, a plurality of the heat dissipation openings may be provided and formed in a louver shape on the inclined surfaces. According to the above configuration, it may be possible to generate intake and exhaust airflow with high efficiency by using the plurality of heat dissipation openings having the louver shape.

The non-contact power transmission device according to one or more embodiments may further include a beam configured to connect the plurality of heat dissipation openings along a direction in which the plurality of heat dissipation openings is lined up. According to the above configuration, the beam may alleviate a decrease in rigidity of the cover member due to the provision of the plurality of heat dissipation openings and increase strength.

Further, in the non-contact power transmission device according to one or more embodiments, the rotation holding portion may be a cylindrical member fitted from the rotating portion side with the rotating portion disposed on the fixed portion, and the rotation holding portion guides an outer peripheral surface of the rotating portion on an inner peripheral surface of the rotation holding portion and is provided with heat dissipation fins on an outer peripheral surface of the rotation holding portion.

According to the above described configuration, an area in contact with air may be increased by the heat dissipation fins provided on the outer peripheral surface of the rotation holding portion located on the outermost side, and a heat dissipation effect is enhanced. Therefore, it may also be possible to suppress a temperature rise inside the non-contact power transmission device.

Further, in the non-contact power transmission device according to one or more embodiments, the heat dissipation fins may be provided at outermost portions of the fixed portion, the rotating portion, or both.

According to the above configuration, an area in contact with air may be increased by the heat dissipation fins provided at the outermost portions of the fixed portion, the rotating portion, or both, and a heat dissipation effect is enhanced. Therefore, it may also be possible to suppress a temperature rise inside the non-contact power transmission device.

According to one or more embodiments, it may be possible to provide the non-contact power transmission device in which the temperature inside the device does not easily rise even if the coil generates heat in power transmission.

DETAILED DESCRIPTION

Hereinafter, one or more embodiment are described with reference to the drawings.

§ 1 Application Example

Figure 3:
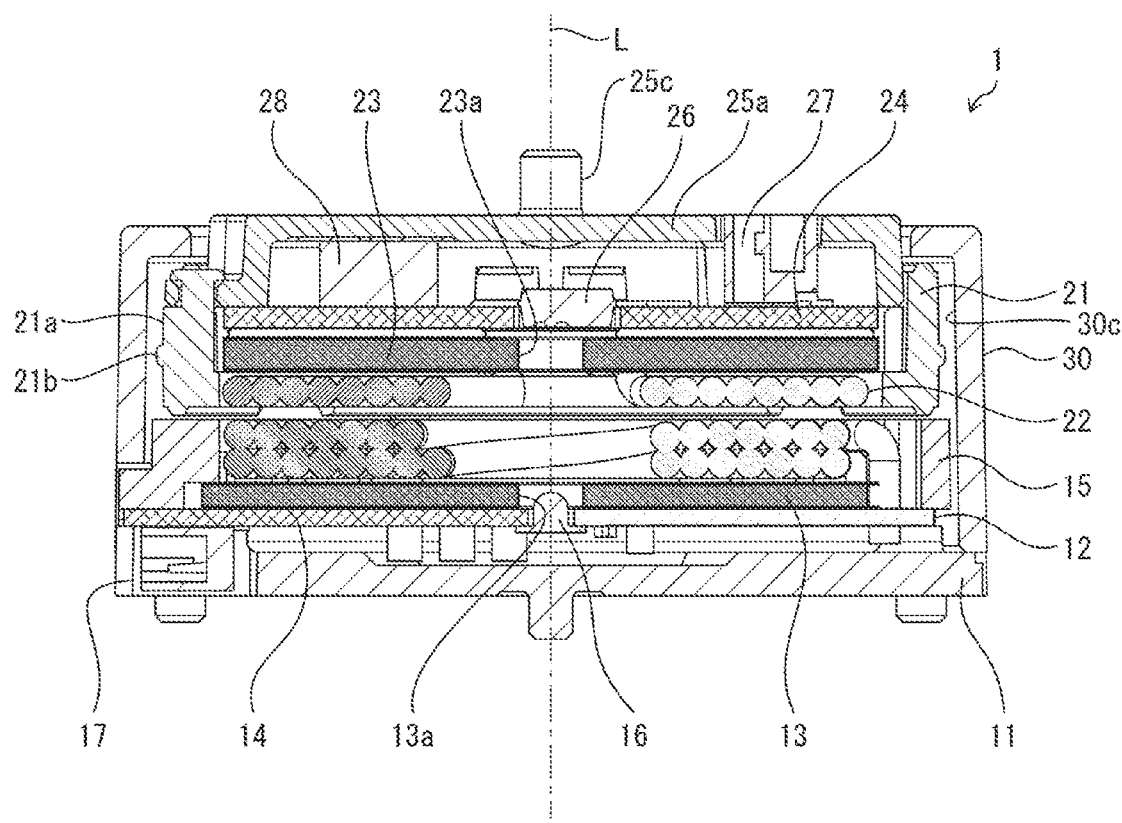
FIG. 3 is a diagram illustrating a sectional view of a non-contact power transmission device along a section surface D in FIG. 1.
Figure 7:
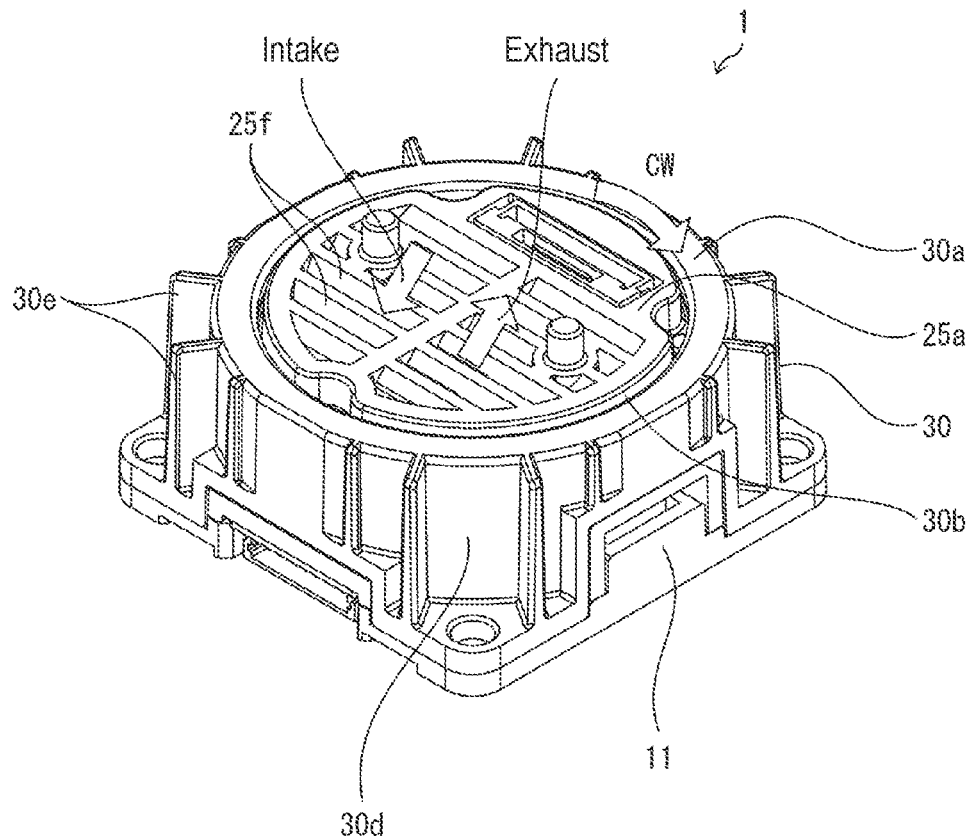
FIG. 7 is a diagram illustrating a perspective view showing intake and exhaust by a heat dissipation opening accompanying rotation of a rotating portion in a non-contact power transmission device.

A non-contact power transmission device 1 is disposed between a game machine and a rotation production device mounted on the game machine, for example, and transmits power. As shown in FIGS. 3 and 7, the non-contact power transmission device 1 includes a fixed portion 10, a rotating portion 20, and a base cover 30 that covers the fixed portion 10 and the rotating portion 20.

The fixed portion 10 is fixed to a casing of the game machine or the like, and the rotating portion 20 rotates about an axis (rotation axis) L with respect to the fixed portion 10. The base cover 30 is fitted from the rotating portion 20 side. A first coil 14 of the fixed portion 10 and a second coil 22 of the rotating portion 20 are disposed so as to face each other, and power is transmitted by using magnetic coupling therebetween. Further, a light emitting element 16 is mounted on the fixed portion 10, and a light receiving element 26 that performs optical communication with the light emitting element 16 is mounted on the rotating portion 20. The first coil 14 and the second coil 22 generate heat due to the power transmission, and temperature inside the non-contact power transmission device 1 rises.

In response to the temperature inside the non-contact power transmission device 1 rising, it may be necessary to regulate continuous energization time and a current value. In the above described case, it is necessary to suppress continuous production time to a short time and secure an interval for cooling. In addition, efficiency of power transmission is reduced and a life of a mounted electronic component is shortened.

Therefore, in the non-contact power transmission device 1, a case cover 25 of the rotating portion 20 has a fan function, and a heat dissipation opening 25f having an inclined surface 25g is formed on an upper surface 25a. As a result, rotation of the rotating portion 20 causes airflow in which air is sucked into the inside of the case cover 25 and the sucked air is discharged to the outside of the case cover 25. The rise in temperature inside the device is effectively suppressed. Further, the base cover 30 which is an outermost side of the non-contact power transmission device 1 is provided with heat dissipation fins 30e, thereby increasing an area in contact with air and enhancing a heat dissipation effect.

§ 2 Configuration Example

A non-contact power transmission device according to one or more embodiments is described with reference to FIGS. 1 to 7. In one or more embodiments, two members that transmit power are the game machine and the rotation production device mounted on the game machine, and a configuration in which power is transmitted from the game machine side to the rotation production device is illustrated.

(1. Overall Configuration)

Figure 1:
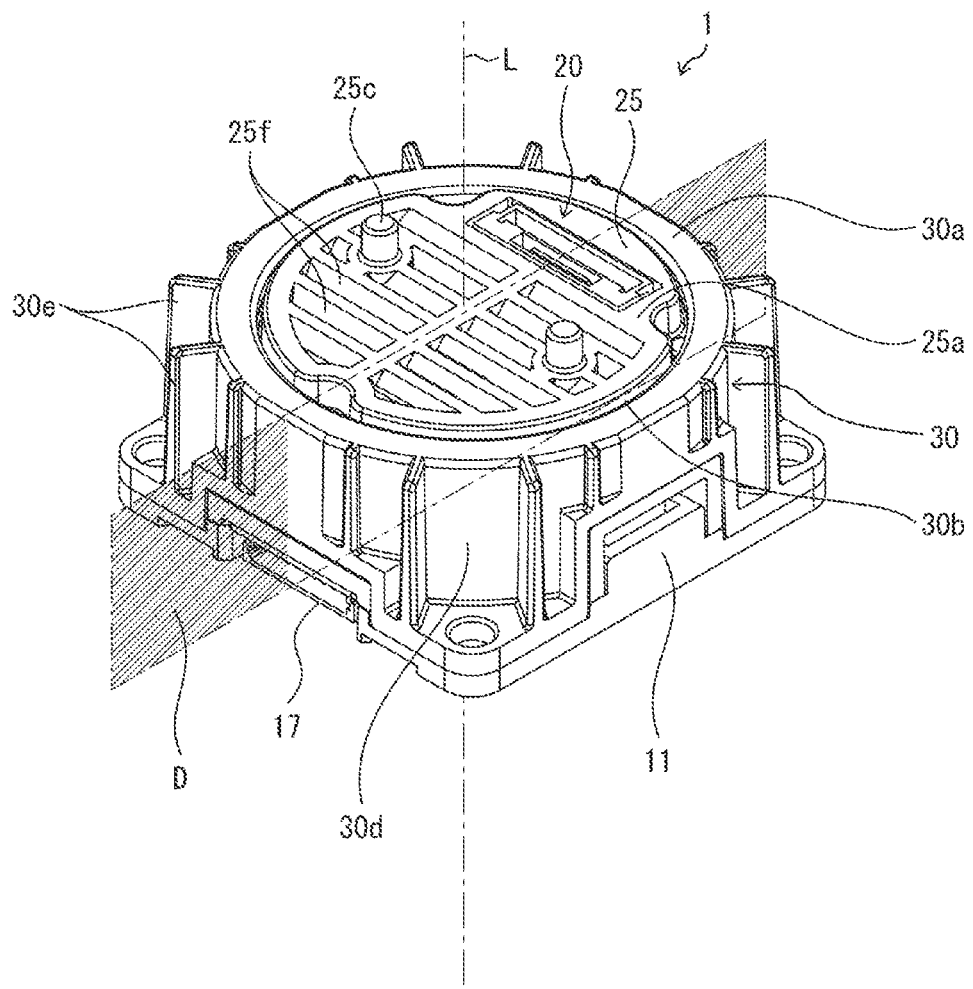
FIG. 1 is a diagram illustrating a perspective view of a non-contact power transmission device according to one or more embodiment.
Figure 2:
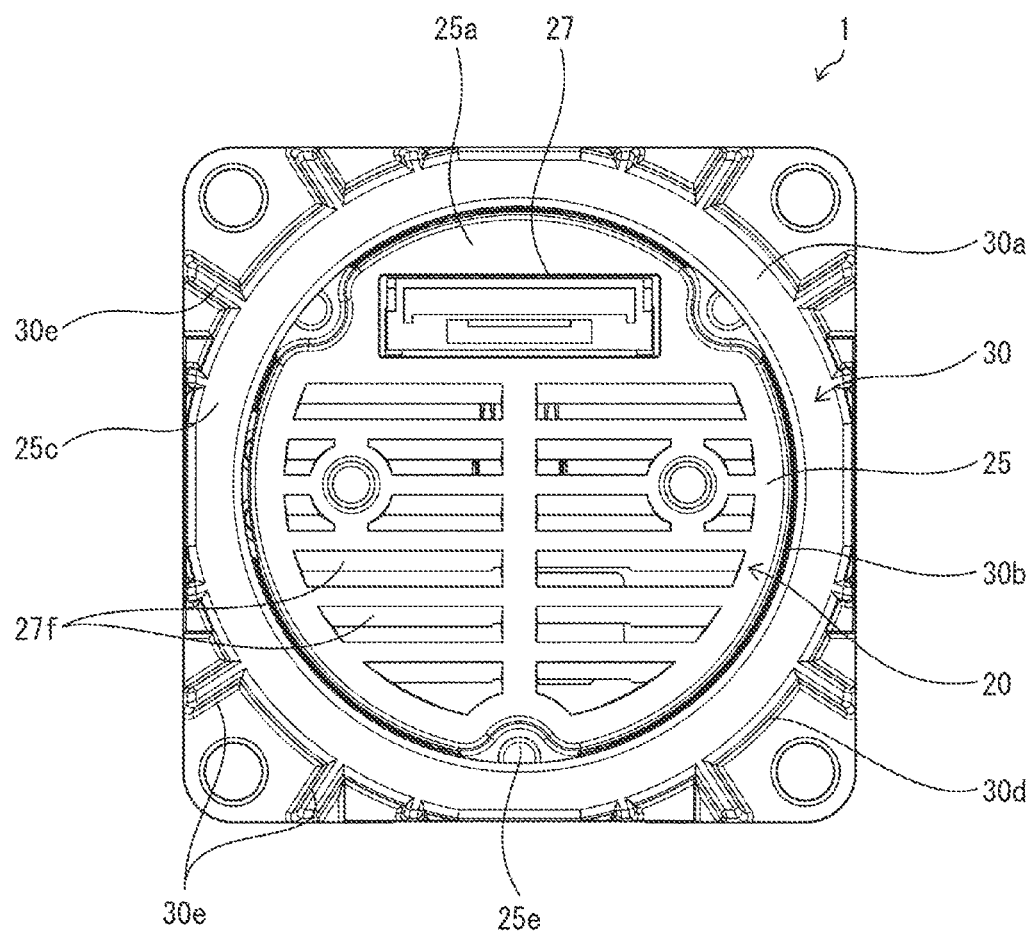
FIG. 2 is a diagram illustrating a plan view of a non-contact power transmission device.
Figure 4:
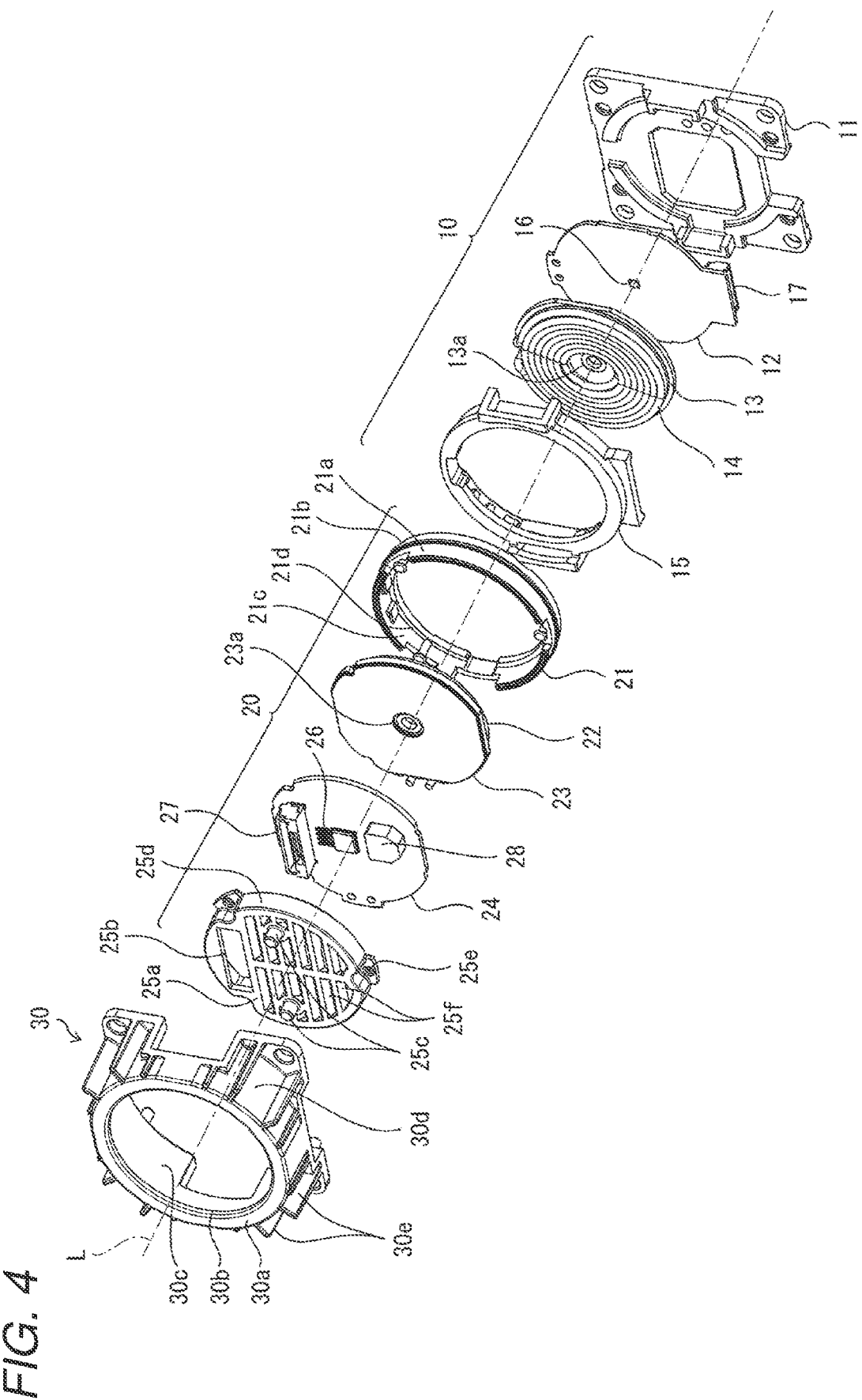
FIG. 4 is a diagram illustrating an exploded perspective view of a non-contact power transmission device.

FIG. 1 is a diagram illustrating a perspective view of the non-contact power transmission device 1 in one or more embodiments. FIG. 2 is a diagram illustrating a plan view of the non-contact power transmission device 1. FIG. 3 is a diagram illustrating a sectional view of the non-contact power transmission device 1 cut at a cut surface D in FIG. 1. FIG. 4 is a diagram illustrating an exploded perspective view of the non-contact power transmission device 1.

As shown in FIGS. 1 to 4, the non-contact power transmission device 1 includes the fixed portion 10, the rotating portion 20, and the base cover (rotation holding portion) 30 that covers the fixed portion 10 and the rotating portion 20. The fixed portion 10 has the first coil 14, and the rotating portion 20 has the second coil 22 disposed to face the first coil 14 and the case cover (cover member) 25 to cover a side of the second coil 22 opposite to the first coil 14 side. The rotating portion 20 rotates about the axis (rotation axis) L with respect to the fixed portion 10. The fixed portion 10 and the rotating portion 20 are disposed so as to overlap each other along the axis L, and the base cover 30 is fitted from the rotating portion 20 side. The fixed portion 10 is fixed to the casing of the game machine together with the base cover 30 by using a screw or the like. With the non-contact power transmission device 1 attached to the casing, the rotating portion 20 is rotatably held between the fixed portion 10 and the inside of the base cover 30 and rotates using an inner peripheral surface 30c of the base cover 30 as a guide surface.

Hereinafter, for convenience of explanation, the non-contact power transmission device 1 will be described on the assumption that it is installed upward on a horizontal surface of the casing. In other words, description will be given while a side on which the rotating portion 20 is located with respect to the fixed portion 10 is on the top and a side on which the fixed portion 10 is located with respect to the rotating portion 20 is on the bottom. Needless to say, the non-contact power transmission device 1 can be installed downward on the horizontal surface, an inclined surface, or a vertical surface.

(2. Fixed Portion 10)

As shown in FIGS. 3 and 4, the fixed portion 10 includes a base 11, a first substrate 12, a first holder 13, the first coil 14, and a coil guide 15.

The base 11 supports each member constituting the non-contact power transmission device 1. The base 11 is also a component for attaching the non-contact power transmission device 1 to the casing together with the base cover 30.

The first substrate 12 uses the light emitting element 16 to output a control signal to the rotating portion 20 side. The light emitting element 16 for performing optical communication is mounted on the axis L of the first substrate 12. The light emitting element 16 is, for example, an LED. The light emitting element 16 emits light to an upper side in which the rotating portion 20 is located. A connector 17 for electrically connecting with the game machine side is attached to a lower surface of the first substrate 12.

The first holder 13 holds the first coil 14, and a first through hole 13a is formed on the axis L. The first coil 14 is circulated around the first through hole 13a on an upper surface of the first holder 13. The center of a circumference of the first coil 14 in which the first through hole 13a and its circumference are located is hollow.

The first substrate 12 and the first coil 14 fixed to the first holder 13 are disposed in this order with respect to the base 11. The first coil 14 is disposed upward so as to face the second coil 22 of the rotating portion 20.

The coil guide 15 is fitted to the base 11 in a state where the first substrate 12 and the first coil 14 fixed to the first holder 13 are disposed on the base 11. The coil guide 15 is for pressing the first coil 14 toward the base 11.

(3. Rotating Portion 20)

As shown in FIGS. 3 and 4, the rotating portion 20 includes a case 21, the second coil 22, a second holder 23, a second substrate 24, and the case cover (cover member) 25.

The case 21 has a cylindrical shape, and in a state of being fitted with the case cover 25, an outer peripheral surface 21a slides on the inner peripheral surface 30c of the base cover 30 as a guide surface. A guide rib 21b is formed on the outer peripheral surface 21a to reduce friction with the inner peripheral surface 30c of the base cover 30. Further, an inner peripheral surface 21c of the case 21 is formed with a step 21d that abuts on a peripheral edge of a lower surface of the second holder 23 and holds the second holder 23.

The second holder 23 holds the second coil 22, and a second through hole 23a is formed on the axis L. The second coil 22 is circulated around the second through hole 23a on the lower surface of the second holder 23. The center of a circumference of the second coil 22 in which the second through hole 23a and its circumference are located is hollow.

The second substrate 24 controls a light emitting element or the like for illumination mounted on the rotation production device, and the light receiving element 26 for performing optical communication is mounted on the axis L. The light receiving element 26 performs optical communication with the light emitting element 16 on the fixed portion 10 side. A light receiving surface of the light receiving element 26 faces a lower side where the fixed portion 10 is located. On an upper surface of the second substrate 24, an electronic component 28 for controlling a production system LED and the like mounted on the rotation production device, a connector 27 for electrically connecting with the rotation production device, and the like are mounted.

The second coil 22 fixed to the second holder 23 and the second substrate 24 are disposed in this order with respect to the case 21. The second coil 22 is disposed downward so as to face the first coil 14 of the fixed portion 10.

The case cover 25 is fitted to the case 21 in a state where the second coil 22 fixed to the second holder 23 and the second substrate 24 are disposed on the case 21. At a lower end of a cylinder 25d forming an outer periphery of the case cover 25, three stoppers 25e are provided radially outward. The case cover 25 and the case 21 are fixed by using the stoppers 25e.

Further, a connector opening 25b for exposing the connector 27 mounted on the second substrate 24 and bosses 25c and 25c for connecting the rotation production device and the rotating portion 20 are formed on the upper surface 25a of the case cover 25.

Furthermore, the case cover 25 has a fan function of generating airflow in which air is sucked into the inside of the case cover 25 and the sucked air is discharged to the outside of the case cover 25, as the rotating portion 20 rotates. The heat dissipation opening 25f, which will be described later, is formed on the upper surface 25a.

(4. Base Cover 30)

As shown in FIGS. 1 to 4, the base cover 30 is fitted to the base 11 with the rotating portion 20 disposed on the fixed portion 10, and is fixed to the casing of the game machine or the like by using a screw or the like together with the base 11. The base cover 30 is a rotation holding portion that rotatably holds the fixed portion 10 and the rotating portion 20. Further, the base cover 30 is a cylindrical member, and the inner peripheral surface 30c guides an outer peripheral surface of the rotating portion 20 (the outer peripheral surface 21a of the case 21).

An upper surface 30a of the base cover 30 is formed with an opening 30b that exposes an upper surface of the rotating portion 20 (the upper surface 25a of the case cover 25). The rotating portion 20 is housed inside the base cover 30 with the upper surface 25a of the case cover 25 slightly protruding from the opening 30b. A diameter of the case cover 25 is formed to be smaller than a diameter of the opening 30b, and a diameter of the case 21 is formed to be larger than the diameter of the opening 30b. As a result, with the base cover 30 fixed to the base 11, the rotating portion 20 is held without falling out from the opening 30b of the base cover 30. Moreover, the heat dissipation fins 30e, which will be described later, are provided on an outer peripheral surface 30d of the base cover 30.

(5. Heat Dissipation Opening 25f)

Figure 5:
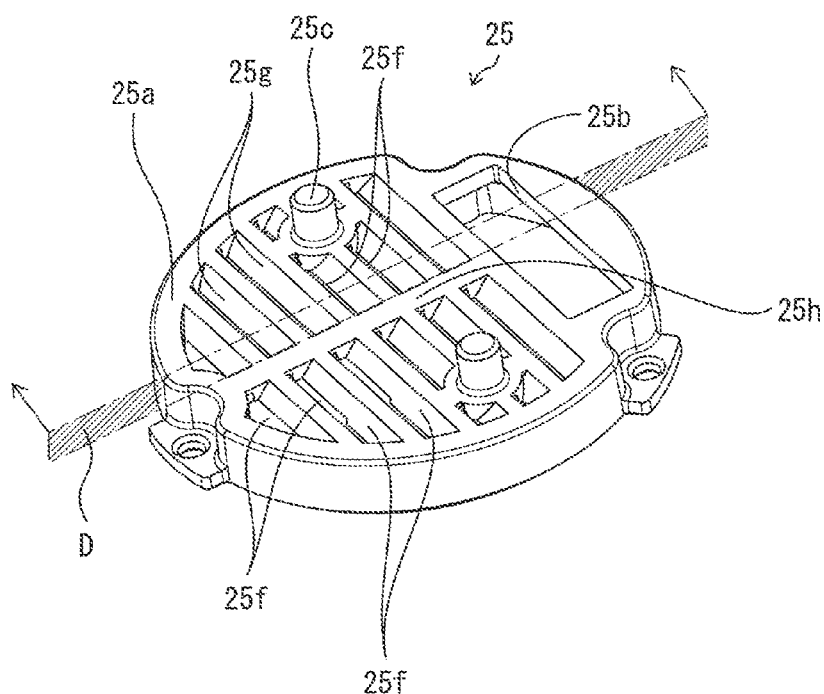
FIG. 5 is a diagram illustrating a perspective view of a case cover of a rotating portion in a non-contact power transmission device.
Figure 6:
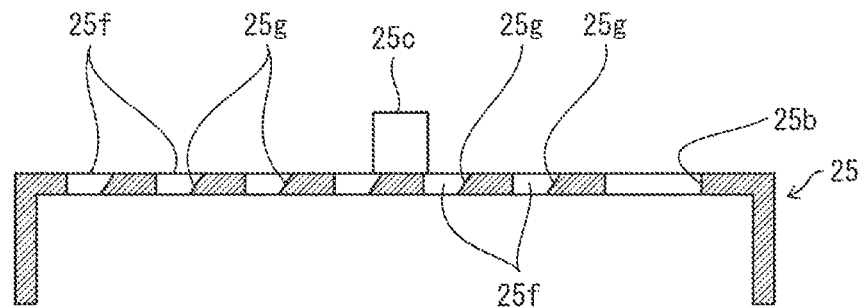
FIG. 6 is a diagram illustrating a sectional view of a case cover along a section surface D in FIG. 5.

FIG. 5 is a diagram illustrating a perspective view of the case cover 25 of the rotating portion 20 in the non-contact power transmission device. FIG. 6 is a diagram illustrating a sectional view of the case cover 25 cut at a cut surface D in FIG. 5. As shown in FIGS. 5 and 6, the heat dissipation opening 25f is formed on the upper surface 25a of the case cover 25. The heat dissipation opening 25f creates airflow in which air is sucked into the inside of the case cover 25 (intake) and the sucked air is discharged to the outside of the case cover 25 (exhaust), as the rotating portion 20 rotates.

In one or more embodiments, the heat dissipation opening 25f is formed on the upper surface 25a (a surface covering a side opposite to the fixed portion 10 side) of the case cover 25 so that a direction orthogonal to the axis L is a longitudinal direction. Moreover, the heat dissipation opening 25f has the inclined surface 25g inclined so as to spread from the outside of the opening toward the inside of the opening on an opening end surface in the longitudinal direction.

In one or more embodiments, a plurality of heat dissipation openings 25f is provided, and in examples of FIGS. 5 and 6, six rows are provided. By providing the plurality of heat dissipation openings 25f, a louver shape is formed on the inclined surfaces 25g. With such a configuration, it is possible to generate intake and exhaust airflow with high efficiency by using the plurality of heat dissipation openings 25f having the louver shape. Note that, in the examples of FIGS. 5 and 6, six heat dissipation openings 25f are provided, but it is sufficient if there is at least one heat dissipation opening 25f.

By the way, it is undeniable that rigidity of the case cover 25 is reduced by providing the plurality of heat dissipation openings 25f. Therefore, in one or more embodiments, a beam 25h is provided which connects the plurality of heat dissipation openings 25f along a direction in which the plurality of heat dissipation openings 25f is lined up. By providing such a beam 25h, it is possible to alleviate a decrease in rigidity of the case cover 25 due to the provision of the plurality of heat dissipation openings 25f and increase strength.

FIG. 7 is a diagram illustrating a perspective view showing intake and exhaust by the heat dissipation opening 25f accompanying rotation of the rotating portion 20 in the non-contact power transmission device 1. As shown in FIG. 7, in response to the rotating portion 20 being rotated clockwise indicated by an arrow CW, a side located on an upstream side of the arrow CW becomes the intake, and a side located on a downstream side of the arrow CW becomes the exhaust. Although not shown, in response to the rotating portion 20 being rotated counterclockwise opposite to the arrow CW, a side located on a counterclockwise upstream side becomes the intake, and a side located on a counterclockwise downstream side becomes the exhaust.

(6. Heat Dissipation Fin 30e)

As shown in FIGS. 1 and 2, the heat dissipation fin 30e is provided on the outer peripheral surface 30d of the base cover 30. The outer peripheral surface 30d of the base cover 30 is the outermost portion of the non-contact power transmission device 1.

In one or more embodiments, the heat dissipation fin 30e extends radially outward from the outer peripheral surface 30d of the base cover 30. A plurality of heat dissipation fins 30e is provided on the outer peripheral surface 30d of the base cover 30 along a circumferential direction.

(7. Effects)

According to the configuration of one or more embodiments, the case cover 25 has a fan function of generating airflow in which air is sucked into the inside and the sucked air is discharged to the outside, as the rotating portion 20 rotates. More specifically, one or more heat dissipation openings 25f having a longitudinal direction orthogonal to the axis L are formed on the upper surface 25a of the case cover 25. The opening end surface in the longitudinal direction of the heat dissipation opening 25f has the inclined surface 25g inclined so as to spread from the outside of the opening toward the inside of the opening.

As a result, even if the first coil 14 and the second coil 22 generate heat in power transmission in response to the device being driven, force of air passing through the inside of the device can forcibly dissipate the heat and suppress a temperature rise inside the device. As a result, it is not necessary to shorten continuous production time or secure an interval for cooling. In addition, it is possible to prevent a decrease in power transmission efficiency and a decrease in a life of a mounted electronic component.

Furthermore, according to the configuration of one or more embodiments, the heat dissipation fins 30e are provided on the outer peripheral surface 30d of the base cover 30 to increase an area in contact with air and enhance a heat dissipation effect. Therefore, it may also be possible to suppress the temperature rise inside the device.

§ 3 Modified Examples

Although one or more embodiments have been described in detail above, the above description is merely an example of the present invention in all respects. Needless to say, various improvements and modifications can be made without departing from the scope of the present invention. For example, the following changes can be made. Note that, in the following, the same reference numerals will be used for the same components as those in one or more embodiments, and the same points as in one or more embodiments will be omitted as appropriate. The following modified examples may be combined as appropriate.

In one or more embodiments, the base cover 30 is used as the rotation holding portion for rotatably holding the fixed portion 10 and the rotating portion 20. However, a radial bearing (ball bearing) 53 can be used instead of the base cover 30.

Figure 8:
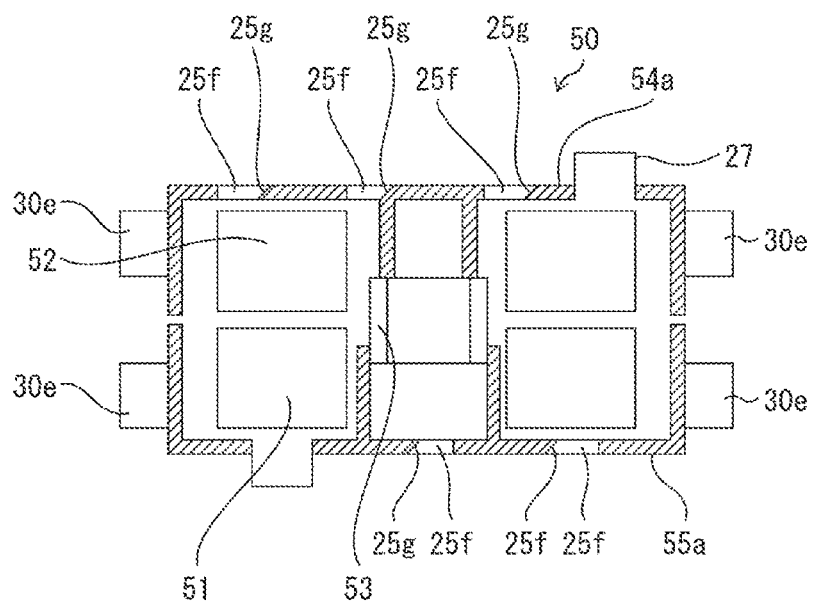
FIG. 8 is a diagram illustrating a sectional view of a non-contact power transmission device in a modified example.

FIG. 8 is a diagram illustrating a sectional view of a non-contact power transmission device 50 in the modified example. As shown in FIG. 8, a first unit 54 having a first coil 51 and a second unit 55 having a second coil 52 are connected via the radial bearing 53. The first unit 54 and the second unit 55 rotate relative to each other. In response to the first unit 54 being the fixed portion, the second unit 55 is the rotating portion, and in response to the first unit 54 being the rotating portion, the second unit 55 is the fixed portion. Further, although not shown, the first unit 54 and the second unit 55 are equipped with optical elements for performing optical communication, substrates, and the like.

The heat dissipation fins 30e are provided at the outermost portions of the first unit 54 and the second unit 55. Further, the heat dissipation opening 25f having the inclined surface 25g is formed on an upper surface 54a of the first unit 54 and a lower surface 55a of the second unit 55.

Further, in one or more embodiments, the configuration in which the fixed portion 10 is provided with the light emitting element 16 and the rotating portion 20 is provided with the light receiving element 26 is illustrated. However, each of the fixed portion 10 and the rotating portion 20 may be provided with the light emitting element 16 and the light receiving element 26. As a result, bidirectional communication is possible between the fixed portion 10 and the rotating portion 20.

The present invention is not limited to the above-described embodiments, and various modifications can be made within the scope of the claims. An embodiment obtained by appropriately combining the technical means disclosed in the different embodiments is also included in the technical scope of the present invention.

The invention claimed is:

1. A non-contact power transmission device comprising:
a fixed portion comprising a first coil;
a rotating portion comprising a second coil positioned to face the first coil and a cover member configured to cover a side of the second coil opposite to the first coil side, the rotating portion being configured to rotate about a rotation axis with respect to the fixed portion; and
a rotation holding portion configured to rotatably hold the fixed portion and the rotating portion, wherein
the cover member comprises a fan configured to generate airflow in which air is sucked into inside of the cover member and the sucked air is discharged to outside of the cover member, as the rotating portion rotates.

2. The non-contact power transmission device according to claim 1, further comprising one or more heat dissipation openings having a longitudinal direction orthogonal to the rotation axis positioned on a surface of the cover member configured to cover a side opposite to the fixed portion side, and an opening end surface in the longitudinal direction of the heat dissipation opening has an inclined surface inclined so as to spread from outside of the opening toward inside of the opening.

3. The non-contact power transmission device according to claim 2, wherein a plurality of the heat dissipation openings is provided and formed in a louver shape on the inclined surfaces.

4. The non-contact power transmission device according to claim 3, further comprising a beam configured to connect the plurality of heat dissipation openings along a direction in which the plurality of heat dissipation openings is lined up.

5. The non-contact power transmission device according to claim 1, wherein the rotation holding portion comprises a cylindrical member fitted from the rotating portion side with the rotating portion disposed on the fixed portion, and the rotation holding portion guides an outer peripheral surface of the rotating portion on an inner peripheral surface of the rotation holding portion and is provided with heat dissipation fins on an outer peripheral surface of the rotation holding portion.

6. The non-contact power transmission device according to claim 2, wherein the rotation holding portion comprises a cylindrical member fitted from the rotating portion side with the rotating portion disposed on the fixed portion, and the rotation holding portion guides an outer peripheral surface of the rotating portion on an inner peripheral surface of the rotation holding portion and is provided with heat dissipation fins on an outer peripheral surface of the rotation holding portion.

7. The non-contact power transmission device according to claim 3, wherein the rotation holding portion comprises a cylindrical member fitted from the rotating portion side with the rotating portion disposed on the fixed portion, and the rotation holding portion guides an outer peripheral surface of the rotating portion on an inner peripheral surface of the rotation holding portion and is provided with heat dissipation fins on an outer peripheral surface of the rotation holding portion.

8. The non-contact power transmission device according to claim 4, wherein the rotation holding portion comprises a cylindrical member fitted from the rotating portion side with the rotating portion disposed on the fixed portion, and the rotation holding portion guides an outer peripheral surface of the rotating portion on an inner peripheral surface of the rotation holding portion and is provided with heat dissipation fins on an outer peripheral surface of the rotation holding portion.

9. The non-contact power transmission device according to claim 1, wherein heat dissipation fins are provided at outermost portions of the fixed portion, the rotating portion, or both.

10. The non-contact power transmission device according to claim 2, wherein heat dissipation fins are provided at outermost portions of the fixed portion, the rotating portion, or both.

11. The non-contact power transmission device according to claim 3, wherein heat dissipation fins are provided at outermost portions of the fixed portion, the rotating portion, or both.

12. The non-contact power transmission device according to claim 4, wherein heat dissipation fins are provided at outermost portions of the fixed portion, the rotating portion, or both.

* * * * *